UNITED STATES PATENT OFFICE.

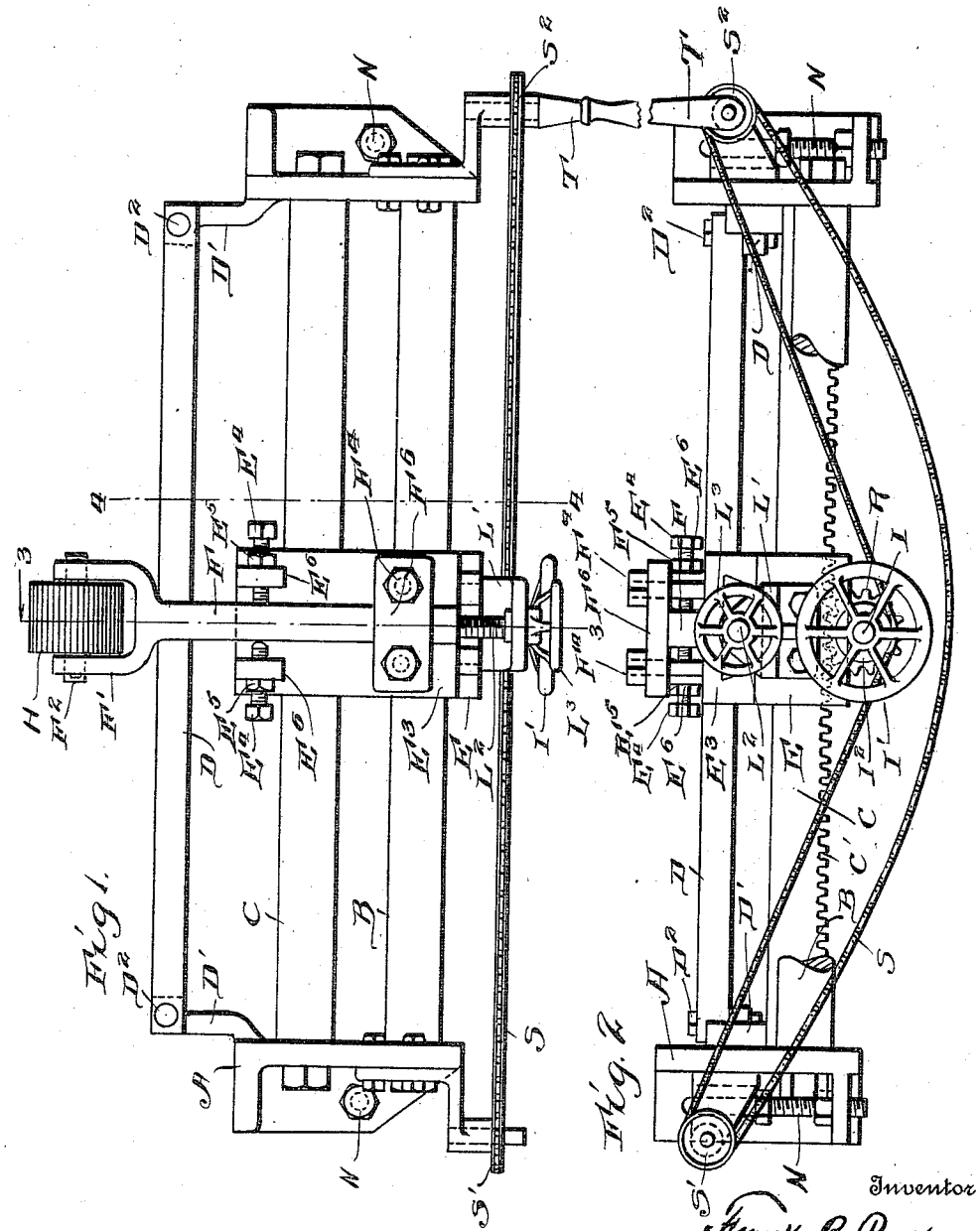

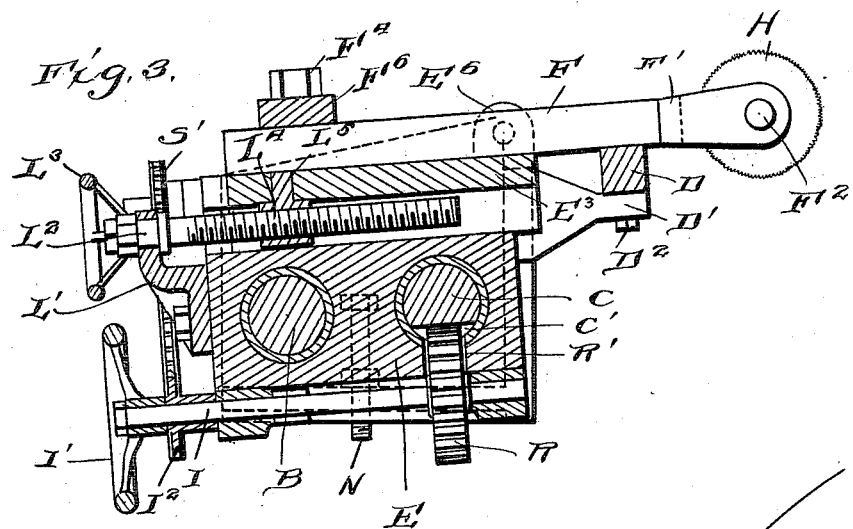
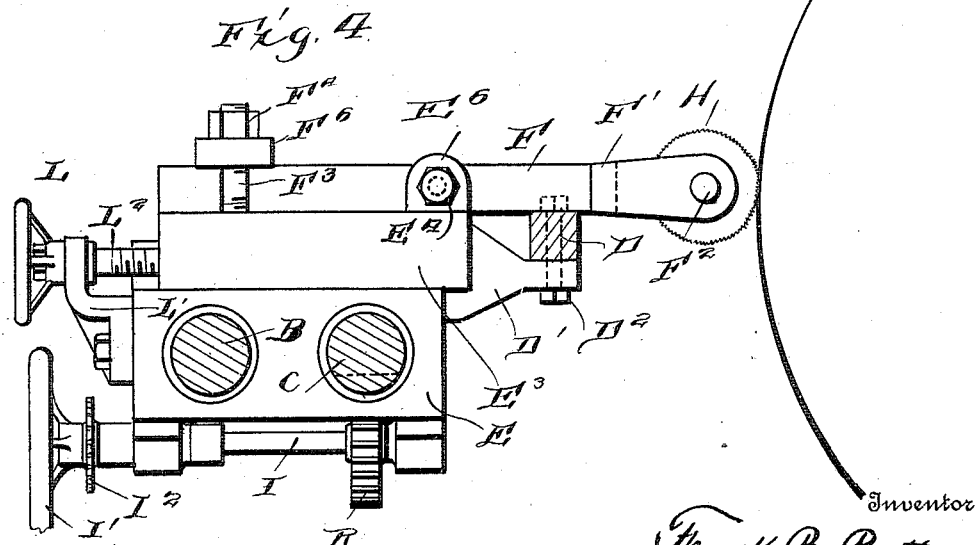

FRANK B. POTTER, OF CARTHAGE, NEW YORK.

STONE-TRUING TOOL.

994,603.  Specification of Letters Patent.  Patented June 6, 1911.

Application filed February 7, 1911. Serial No. 607,180.

*To all whom it may concern:*

Be it known that I, FRANK B. POTTER, a citizen of the United States, residing at Carthage, in the county of Jefferson and State of New York, have invented certain new and useful Improvements in Stone-Truing Tools; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in stone truing tools and the object in view is to produce a simple and efficient apparatus of this nature having various details of construction and combinations and arrangements of parts which will be hereinafter fully described and then specifically defined in the appended claim.

I illustrate my invention in the accompanying drawings, in which:—

Figure 1 is a top plan view of my improved apparatus. Fig. 2 is a side elevation. Fig. 3 is a cross sectional view on line 3—3 of Fig. 1, and Fig. 4 is a sectional view on line 4—4 of Fig. 1.

Reference now being had to the details of the drawings by letter, A designates the frame of the machine, made preferably of metal, and is adapted to be bolted or otherwise securely fastened to a grinder casing in which the stone to be burred or trued is mounted. Said frame has mounted therein a bar B which I have shown as cylindrical in cross section and upon which the rear portion of the chuck head is mounted, said chuck head being made up of two parts E and E³, having dovetail connection one with the other. The bar B passes through an opening in the lower section E of the chuck head and upon which latter said chuck head moves freely. A bar C, which is also cylindrical, is provided with milled slots or teeth C' formed in the lower portion thereof and said bar C serves as a way upon which the chuck head is guided as it is moved in opposite directions. An angular outlined bar D is mounted upon the bracket arms D' of the frame and is held thereto by means of bolts D² or other suitable fastening means, said bar D being provided as a support and guide for the arm F which has a forked end F' in which a pivotal pin F² is mounted and upon which the bur wheel H is journaled. Rising from the upper surface of the section E³ of the chuck head are the lugs E⁶, each provided with a threaded aperture for the reception of a set screw E⁴ and a jam nut E⁵ is mounted upon each screw and is adapted to bear against the outer face of each lug and serves to hold the screws in adjusted positions. It will be noted that the arm F carrying said bur is positioned intermediate the inner ends of the set screws, which latter are adapted to adjust and hold the arm in different positions. Swiveled in an aperture in the bracket arm L', which is bolted to the chuck head, is a screw L² to which a hand wheel L³ is fixed and a sleeve L⁴, interiorly threaded, receives said screw and is provided with a shank portion L⁵ fixed to the section E³, forming means whereby, as the wheel L³ is turned in one direction or the other, the section E³ and the bur may be moved backward and forward.

Mounted in suitable bearings underneath the chuck head is a rotatable shaft I to which a hand wheel I' and a sprocket wheel I² are fixed. A pinion R is also fixed to the shaft I and turns in a recess R' formed in the section E of the chuck head, said pinion meshing with the teeth or notches formed in the lower portion of the bar C, as shown clearly in Figs. 2 and 3 of the drawings, and affording means whereby, as the wheel I' is turned in one direction or the other, a longitudinal movement may be imparted to the chuck head. A sprocket chain S passes over the sprocket wheel I² and also the two sprocket wheels S' and S² mounted one near either end of the frame and a crank handle T is fixed to rotate with the sprocket wheel S² and forms means whereby, as the crank handle is turned, a rotary movement may be imparted to the shaft I.

In order to level the apparatus, screws N are mounted in threaded apertures in the frame and are adapted to bear against the casing upon which the frame is mounted.

The operation of the apparatus will be readily understood and is as follows:—The adjusting screws are first set to level the frame carrying the bur wheel. The hand wheel J is turned until one edge of the bur wheel comes in contact with the wheel to be trued and in the rotary movement of the latter the bur wheel will cut into the stone and, as the opposite edge of the bur wheel is slightly away from the surface being trued, there will be a tendency for said separated edge to climb on to the surface of the stone or to reach for a new surface and so pull itself along until it travels across the face of the stone. When the bur wheel has traveled across the face of the stone and arrives at its edge, its travel will stop, after which, by the manipulation of the crank handle T or the wheel I', the chuck head may be returned to its starting position and the operation repeated.

By the provision of an apparatus made in accordance with my invention, it will be noted that a means is afforded whereby the bur may be automatically operated as it traverses the surface of the wheel and, by the provision of the toothed or slotted way bar, actuated by the pinion, a more sensitive adjustment is afforded than would be the case with screws which are commonly utilized in machines of various types.

What I claim to be new is:—

A stone truing apparatus comprising a frame for attachment to the grinder casing, a chuck head made up of two sections, one having sliding dove-tail connection upon the other, a bar upon which the lower of the sections is guided, a second bar passing through the lower section of the chuck head and having serrations therein, a rotatable shaft and hand wheel thereon, a pinion fixed to said shaft and meshing with said serrations, a bur wheel and arm in which the same is journaled, said arm being fastened to the sliding chuck section, a screw swiveled to the lower section, a hand wheel upon said screw, a sleeve fastened to the sliding section and in which said screw is adapted to turn, a sprocket wheel fixed to said screw, sprocket wheels journaled adjacent to the ends of the frame, a chain passing about said sprocket wheels, and a crank handle fixed to actuate one of the sprocket wheels.

In testimony whereof I hereunto affix my signature in the presence of two witnesses.

FRANK B. POTTER.

Witnesses:
LEWIS THORNE,
ALONZO PERINGS.

---

Copies of this patent may be obtained for five cents each, by addressing the "Commissioner of Patents, Washington, D. C."